United States Patent [19]

Hayashi et al.

[11] Patent Number: 5,373,949

[45] Date of Patent: Dec. 20, 1994

[54] POSITIONING DEVICE FOR PARTS SUPPLY TRAY

[75] Inventors: Shoichi Hayashi, Chiba; Hideo Kawabe, Saitama, both of Japan

[73] Assignee: Sony Corporation, Tokyo, Japan

[21] Appl. No.: 117,735

[22] Filed: Sep. 8, 1993

Related U.S. Application Data

[63] Continuation of Ser. No. 682,694, Apr. 9, 1991, abandoned.

[30] Foreign Application Priority Data

Apr. 13, 1990 [JP] Japan .................................. 2-98255

[51] Int. Cl.⁵ .................................................. A47F 3/08
[52] U.S. Cl. ................................ 211/1.51; 211/59.1; 269/309
[58] Field of Search ................ 108/20, 143; 74/16; 211/126, 1.51, 59.1; 269/309, 310, 47

[56] References Cited

U.S. PATENT DOCUMENTS

| | | | |
|---|---|---|---|
| 729,642 | 6/1903 | Nash | 108/20 |
| 1,348,386 | 8/1920 | Wronowski | 108/20 |
| 1,448,446 | 3/1923 | Hulbert | 108/20 |
| 1,500,767 | 7/1924 | Cunningham et al. | 211/49.1 |
| 1,656,527 | 1/1928 | Messinger et al. | 108/20 |
| 2,624,578 | 1/1953 | Lancaster | 108/20 |
| 2,648,227 | 8/1953 | Savory | 74/16 |
| 3,385,117 | 5/1968 | Braun | 74/16 |
| 3,563,186 | 2/1971 | Piper | 108/143 |
| 4,398,349 | 8/1983 | Bailey | 269/8 X |
| 4,601,226 | 7/1986 | McClintock | 108/143 X |
| 4,624,405 | 11/1986 | Newell | 269/900 X |
| 4,901,990 | 2/1990 | Frechette | 269/900 X |

*Primary Examiner*—Ramon O. Ramirez
*Assistant Examiner*—Korie H. Chan
*Attorney, Agent, or Firm*—Jay H. Maioli

[57] ABSTRACT

A positioning device for a parts supply tray has a plurality of areas each for containing a part. The parts supply tray is formed with a plurality of positioning holes each located at a substantially central position in each of the areas. The positioning device has a plurality of positioning pins adapted to be inserted into the positioning holes of the parts supply tray, respectively. When the part contained in one of the areas is to be selectively picked up, one of the positioning pins in the selected area is selectively inserted into the positioning hole corresponding to the selected positioning pin to thereby position the parts supply tray in a fixed position for each selected area.

3 Claims, 3 Drawing Sheets

POSITIONING DEVICE FOR PARTS SUPPLY TRAY

This is a continuation of application Ser. No. 07/682,694 filed Apr. 9, 1991 now abandoned.

BACKGROUND OF THE INVENTION

The present invention relates to a positioning device for a parts supply tray, and more particularly to such a positioning device suitable for use with an automatic assembly system employing a robot.

Generally, a parts supply tray to be used in an automatic assembly operation employing a robot must maintain a high dimensional accuracy such that an arm of the robot can pick up a part. In the case that a physical distribution tray (a tray for transporting elements between factories) formed of foamed synthetic resin so as foamed styrene resin is used as the parts supply tray, a positioning accuracy of the parts supply tray tends to be influenced by aged deformation of the foamed synthetic resin forming the physical distribution tray. To cover this influence, it is necessary to check a pickup position of the part by using an external sensor such as a TV camera.

Conventionally, the parts contained in the physical distribution tray formed of foamed synthetic resin are not directly supplied to the robot, but they are first transferred to a special parts supply tray having a high dimensional accuracy. Then, the parts supply tray is supplied to a parts supply station for the robot.

In such a conventional method, the parts supply tray to be used with the automatic assembly system requires a high dimensional accuracy such that the arm of the robot can pick up the part from the parts supply tray, causing an increase in manufacturing cost. Further, it is necessary to transfer the parts from the physical distribution tray to the parts supply tray and then rearrange the parts on the parts supply tray by hand. On the other hand, in the case of using the physical distribution tray as the parts supply tray, the positioning accuracy of the physical distribution tray is influenced by aged deformation of the foamed synthetic resin forming the physical distribution tray. To solve this problem, it is necessary to use an external sensor such as a TV camera.

SUMMARY OF THE INVENTION

It is accordingly an object of the present invention to provide a positioning device for a parts supply tray which can use an inexpensive physical distribution tray instead of a costly supply tray requiring a high dimensional accuracy, thereby greatly reducing a cost.

It is another object of the present invention to provide a positioning device for a parts supply tray which can ensure a positions accuracy of the tray without the necessity of an external sensor such as a TV camera.

According to the present invention, there is provided a positioning device for a parts supply tray, said parts supply tray having a plurality of areas each for containing a part, said parts supply tray being formed with a plurality of positioning holes each located at a substantially central position in each of said areas, said positioning device comprising a plurality of positioning pins adapted to be inserted into said positioning holes of said parts supply tray, respectively, wherein when said part contained in one of said areas is to be selectively picked up, one of said positioning pins in said selected area is selectively inserted into said positioning hole corresponding to the selected positioning pin to position said parts supply tray in a stabilized position.

With this construction, the tray is positioned by selectively inserting one of the positioning pins into the corresponding positioning hole in each area containing the part to be picked up. That is, the areas of the tray can be selectively and individually positioned. Accordingly, an inexpensive physical distribution tray formed of foamed synthetic resin can be used as the supply tray. That is, a costly special parts supply tray requiring a high dimensional accuracy is not necessary. Therefore, labor for transfer of the parts from the physical distribution tray to the supply tray can be saved. Furthermore, as the parts supply tray is positioned at every area thereof, the part contained in each area can be accurately picked up without using a TV camera or the like.

Other objects and features of the invention will be more fully understood from the following detailed description and appended claims when taken with the accompanying drawings.

DETAILED DESCRIPTION OF THE PREFERRED EMBODIMENTS

Figure 1:
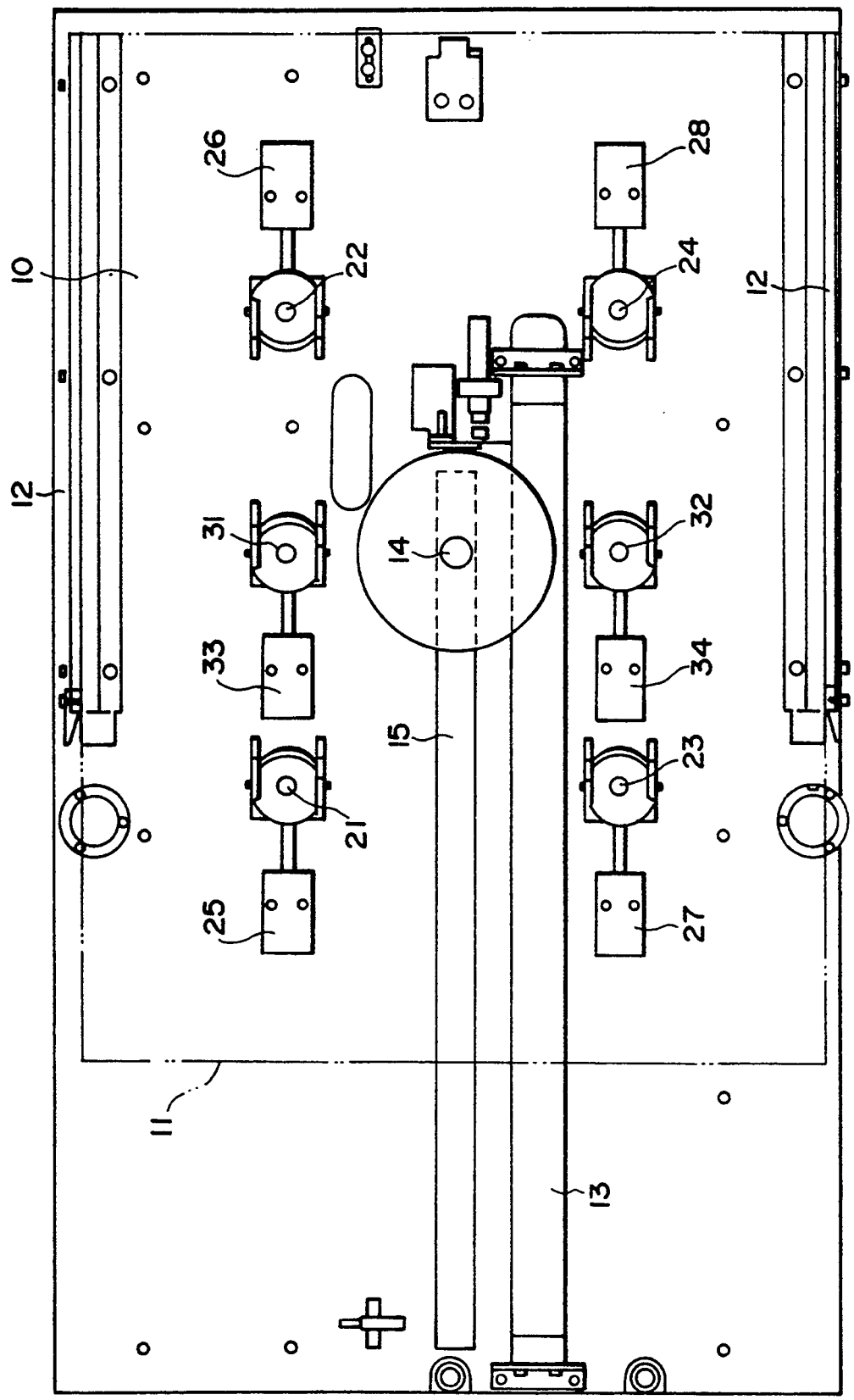
FIG. 1 is a plan view of the positioning device according to a preferred embodiment of the present invention.

Referring to FIG. 1 which shows the positioning device for a parts supply tray according to a preferred embodiment of the present invention, reference numeral 10 designates a base of the positioning device. A parts supply tray 11 is adapted to be placed on the base 10. A pair of guide rails 12 are provided on the base 10 at upper and lower side portions thereof as viewed in FIG. 1. The tray 11 is adapted to be positioned by the guide rails 12. An air cylinder 13 is provided on the base 10 so as to extend in a longitudinal direction of the base 10. The tray 11 is adapted to be moved in the longitudinal direction of the base 10 through a tray moving pin 14 by operating the air cylinder 13. The tray moving pin 14 is guided by a guide 15 extending substantially parallel to the air cylinder 13 in the longitudinal direction of the base 10.

There are provided on the base 10 four positioning pins 21, 22, 23 and 24 for preventing movement of the tray 11 with respect to the longitudinal direction and a transverse direction of the base 10. When the tray 11 is placed on the base 10, the positioning pins 21 to 24 are disposed under the tray 11. The positioning pins 21 to 24 are adapted to be vertically moved by four air cylinders 25, 26, 27 and 28, respectively. Further, a positioning pin 31 for positioning the tray 11 with respect to rotation thereof is provided on the base 10 at an intermediate position between the positioning pins 21 and 22. Similarly, another positioning pin 32 for preventing movement of the tray 11 with respect to rotation thereof is provided on the base 10 at an intermediate position between the positioning pins 23 and 24. These positioning pins 31 and 32 are adapted to be vertically moved by two air cylinders 33 and 34, respectively.

Figure 2:
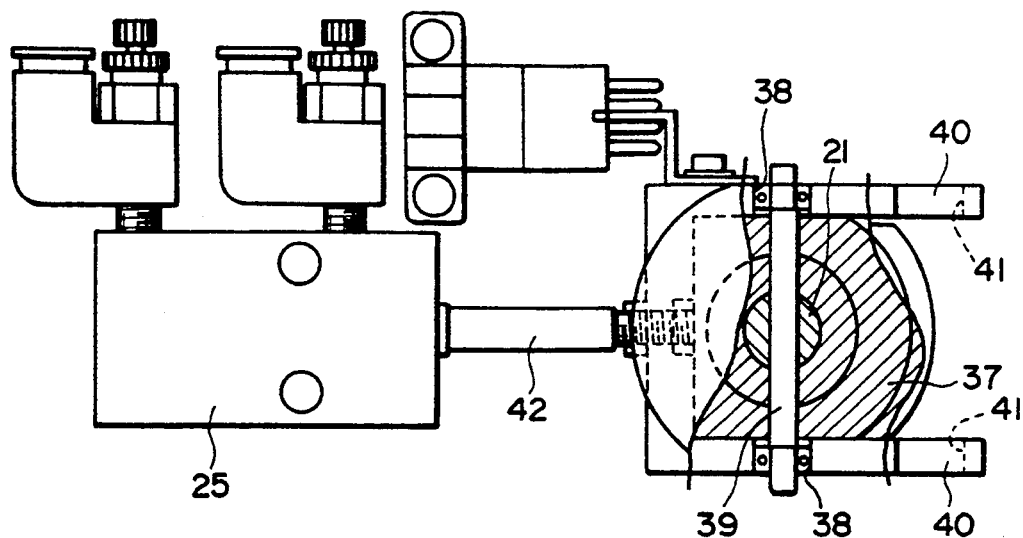
FIG. 2 is a plan view of a vertically moving mechanism for a positioning pin shown in FIG. 1.
Figure 3:
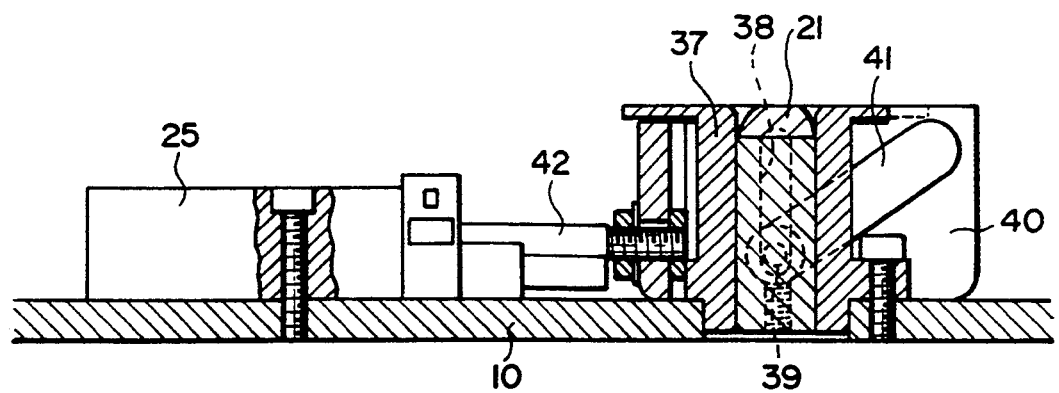
FIG. 3 is a vertical sectional view of the vertically moving mechanism.

Referring next to FIGS. 2 and 3 which show a mechanism for vertically moving the positioning pin 21, a flange guide 37 is fixed on the base 10, and the positioning pin 21 is vertically movably supported by the flange guide 37. The flange guide 37 is formed with a pair of vertical grooves 38 for guiding a horizontal pin 39. The horizontal pin 39 is diametrically inserted through the positioning pin 21, and is fixed thereto. Opposite end portions of the horizontal pin 39 are received in a pair of inclined grooves 41 formed in a pair of brackets 40 standing on the base 10 in parallel opposed relationship to each other. The brackets 40 are connected through a rod 42 to the air cylinder 25.

The same mechanism as the above is provided for the other positioning pins 22 to 24, 31 and 32, and the explanation thereof will be accordingly omitted.

Figure 4:
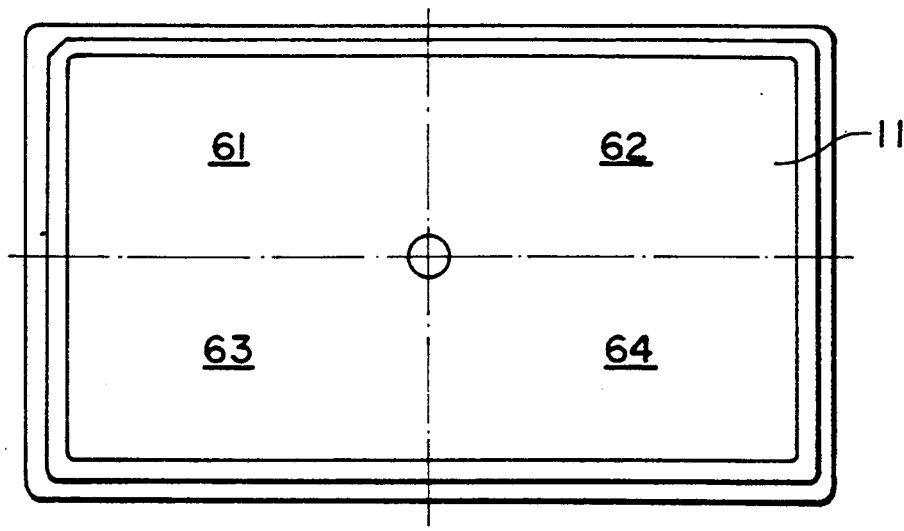
FIG. 4 is a top plan view of a parts supply tray to be positioned by the positioning device shown in FIG. 1.
Figure 5:
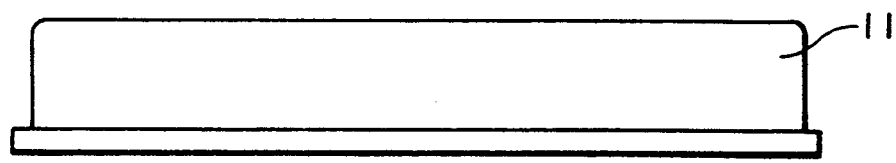
FIG. 5 is an elevational view of FIG. 4.
Figure 6:
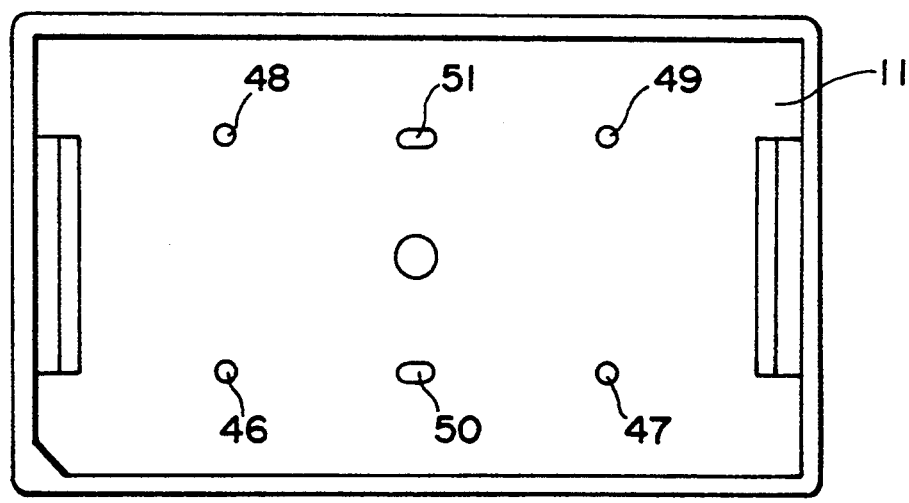
FIG. 6 is a bottom plan view of FIG. 4.

Referring next to FIGS. 4 to 6 which show the tray 11 to be positioned by the positioning device mentioned above, the tray 11 has four areas 61, 62, 63 and 64 for individually containing parts. The tray 11 is formed of foamed synthetic resin of a low grade. As shown in FIG. 6, a bottom surface of the tray 11 is formed with four pin insert holes 46, 47, 48 and 49 for receiving the positioning pins 21, 22, 23 and 24 of the positioning device, respectively. Each of the pin insert holes 46 to 49 is formed at a substantially central position of each of the corresponding areas 61 to 64 of the tray 11. Furthermore, the bottom surface of the tray 11 is formed with a pin insert hole 50 for receiving the positioning pin 31 of the positioning device. The pin insert hole 50 is formed at an intermediate position between the pin insert holes 46 and 47. Similarly, the bottom surface of the tray 11 is formed with a pin insert hole 51 for receiving the positioning pin 32 of the positioning device. The pin insert hole 51 is formed at an intermediate position between the pin insert holes 48 and 49. These pin insert holes 50 and 51 are formed as elongated holes extending in the longitudinal direction of the tray 11.

The operation of the above preferred embodiment will now be described.

In case of lifting the positioning pin 21, the brackets 40 are moved leftwardly as viewed in FIGS. 2 and 3 through the rod 42 by the air cylinder 25. As a result, the horizontal pin 39 engaged at its opposite end portions with the inclined grooves 41 of the brackets 40 is moved upwardly as being guided by the vertical grooves 38. Accordingly, the positioning pin 21 fixed to the horizontal pin 39 is moved upwardly as being guided by the flange guide 37, and is inserted into the pin insert hole 46 formed through the bottom surface of the tray 11. Thus, tray 11 is positioned with respect to both the longitudinal direction and the transverse direction by inserting the positioning pin 21 into the pin insert hole 46. At the same time, the positioning pin 31 is moved upwardly by operating the air cylinder 33 in the same manner as the above, and is inserted into the pin insert hole 50. Thus, the tray 11 is positioned with respect to the rotation thereof by inserting the positioning pin 31 into the pin insert hole 50.

In each of the four areas 61 to 64 of the tray 11, a part is contained under a predetermined position. In case of picking up the part from the area 61 by means of a robot arm, the positioning pin 21 is inserted into the pin insert hole 46, and the positioning pin 31 is also inserted into the pin insert hole 50. Thus, the area 61 of the tray 11 is positioned. In case of picking up the part from the area 62, the positioning pin 22 is inserted into the pin insert hole 47, and the positioning pin 31 is also inserted into the pin insert hole 50. Thus, the area 62 of the tray 11 is positioned. In case of picking up the part from the area 63, the positioning pin 23 is inserted into the pin insert hole 48, and the positioning pin 32 is also inserted into the pin insert hole 51. Thus, the area 63 of the tray 11 is positioned. In case of picking up the part from the area 64, the positioning pin 24 is inserted into the pin insert hole 49, and the positioning pin 32 is inserted into the pin insert hole 51. Thus, the area 64 of the tray 11 is positioned.

In this manner, the areas 61 to 64 of the tray 11 are positioned selectively and individually. Accordingly, deformation of the tray 11 formed of foamed synthetic resin can be compensated and a required positioning accuracy can be obtained in each of the areas 61 to 64 of the tray 11. In other words, the physical distribution tray 11 formed of foamed synthetic resin can be used instead of a parks supply tray requiring a high dimensional accuracy. Furthermore, labor necessary to transfer the parts from the physical distribution tray to the parts supply tray is Saved to thereby achieve a great reduction in cost in supplying the parts.

While the invention has been described with reference specific embodiments, the description is illustrative and is not to be construed as limiting the scope of the invention. Various modifications and changes may occur to those skilled in the art without departing from the spirit and scope of the invention as defined by the appended claims.

What is claimed is:

1. A positioning device for use with a parts supply tray including a plurality of part-containing areas each formed on a top outer surface of the tray for containing a part, the tray further being formed with a plurality of positioning holes each located on a bottom outer surface of the tray, said positioning device comprising:
    a base;
    a plurality of positioning pins connected to said base and adapted to be selectively and individually raised to protrude from a retracted position; and
    means mounted on said base for raising each or said positioning pins selectively and individually from the retracted position to protrude from said base for insertion into corresponding ones of said positioning holes formed in a bottom outer surface of a parts supply tray, respectively, and for lowering each of said positioning pins selectively and individually to the retracted position.

2. The positioning device as defined in claim 1, wherein the parts supply tray has at least one second positioning hole located at an intermediate position between two of the plurality of positioning holes and said positioning device further comprises at least one second positioning pin and means for raising said second positioning pin to protrude from a retracted position for insertion into the second positioning hole for positioning the parts supply tray, whereby one of said plurality of positioning pins and said second positioning pin inhibit rotation of the parts supply tray.

3. The positioning device for a parts supply tray as defined in claim 1, wherein said means for raising each of said plurality of positioning pins comprises, respectively:
    a horizontal pin attached to a respective one of said positioning pins;

a flange guide fixed to said base of said positioning device for movably retaining said horizontal pin, said flange guide having a pair of vertical grooves for guiding said horizontal pin, whereby said one of said plurality of positioning pins and said horizontal pin are vertically movable within said flange guide;

a pair of brackets slidably mounted on said base of the positioning device, each bracket including an inclined groove, said horizontal pin being diametrically inserted through said positioning pin and opposite end portions of said horizontal pin are received in corresponding inclined grooves formed in respective ones of said pair of brackets; and an air cylinder for sliding said brackets in a horizontal direction, whereby said horizontal pin slides in said inclined grooves and said positioning pin is raised to protrude from the retracted position.

* * * * *

UNITED STATES PATENT AND TRADEMARK OFFICE
CERTIFICATE OF CORRECTION

PATENT NO. : 5,373,949
DATED : December 20, 1994
INVENTOR(S) : Shoichi Hayashi and Hideo Kawabe It is certified that error appears in the above-indentified patent and that said Letters Patent is hereby corrected as shown below:

```
Col. 1, line 15, change "such" to --so--
        line 18, change "so" to --such--
        line 22, change "cover" to --guard against--
        line 55, change "positions" to --positioning--
Col. 3, line 53, after "Thus," insert --the--
Col. 4, line 16, after "compensated" insert --,--
        line 20, change "parks" to --parts--
        line 23, change "Saved" to --saved--
        line 26, after "ence" insert --to--

Col. 4, line 43, change "or" to --of--
```

Signed and Sealed this

Thirty-first Day of October 1995

Attest:

BRUCE LEHMAN

Attesting Officer

Commissioner of Patents and Trademarks